July 17, 1962  W. A. AFFELDT  3,044,813
COUPLING
Filed Oct. 6, 1958

Inventor
Walter A. Affeldt
by Howard B. Scheckman
Attorney

United States Patent Office 3,044,813
Patented July 17, 1962

3,044,813
COUPLING
Walter A. Affeldt, La Crosse, Wis., assignor to Allis-Chalmers Manufacturing Company, Milwaukee, Wis.
Filed Oct. 6, 1958, Ser. No. 765,437
4 Claims. (Cl. 287—114)

This invention relates generally to vehicle hitches and more particularly to an improved coupling, of the general type described in copending U.S. application No. 765,508, filed October 6, 1958, now U.S. Patent 2,971,776 by which a drawn load such as an agricultural implement can be connected to a tractor or the like.

It is well known to employ a yieldable hitch when connecting an implement to a tractor (e.g. U.S. Patent Nos. 2,102,722 and 2,541,356). This is done to prevent injury to the operator or implement if an obstruction is hit by the implement.

The coupling part of the hitch acts like an overload release. In normal operation, when the load is normal, the coupling holds the hitch in a contracted position. When the load increases beyond a predetermined amount, such as when an obstruction is hit, the coupling releases and permits the hitch to extend.

In normal operation the coupling must be capable of pulling implements, such as single or multiple plows, through the ground without releasing. This puts a heavy load on the coupling. And this load is increased even more during the time an obstruction is hit and the coupling releases.

Due to the large load on the coupling, the parts of the coupling which carry the load get deformed. With parts of the coupling deformed, not only is the life of the coupling shortened, but the coupling acts erratic and does not release when it should.

It is an object of this invention to provide an improved releasable coupling which can withstand large loads and which lasts longer than prior art type couplings.

Other objects and advantages will appear from the following description considered in conjunction with the attached drawing, in which.

Figure 1:
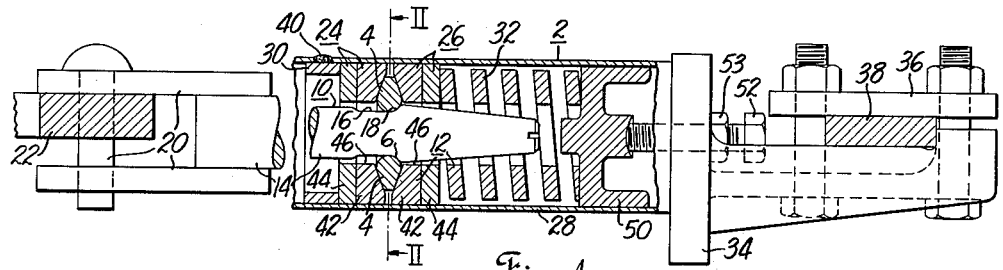
FIG. 1 is a sectional view of the coupling in its normal position with the follower segments gripping and holding the rod member in its engaged position.

For accomplishment of the foregoing objects, this invention contemplates providing a coupling 2 that includes a plurality of follower segments 4 that grip a member 10 of irregular contour. Each follower segment 4 is made so that its gripping surface 6 is complementary to the surface of member 10 which subjects the follower segment to the greatest stress.

Referring generally to the drawings, coupling 2 comprises a member 10 and a detent means 12 which includes a plurality of follower segments 4 that grip member 10. Under normal load, follower segments 4 prevent member 10 from being pulled past them. When an obstruction is hit, follower segments 4 are forced outwardly by the variable contour of member 10 as it is pulled from the detent means 12. It is these follower segments 4 that get deformed by the large load.

Member 10 which is gripped by detent means 12 is illustrated as a circular rod 14 of irregular contour that contains a small diameter or recessed portion 16 and a larger diameter or abutment portion 18. The rod is movable axially into and out of detent means 12. One end of the rod is tapered. The other end of the rod is provided with attaching means 20 in the form of a pin and yoke for connection to drawbar 22 of the implement (not shown).

Detent means 12 which grips rod 14 comprises: first and second cam members 24, 26 that cam a plurality of follower segments 4 into gripping engagement with rod 14, a support in the form of cylinder 28, a collar 30 which acts as a stop within the cylinder, and force means in the form of spring 32 carried by the support and which cooperates with cams 24, 26 to urge said follower segments 4 into gripping engagement with rod 14.

Cylinder 28 has one end closed by head 34 and the other end open for passage of rod 14. Head 34 is provided with attaching means in the form of a clamp 36 for attachment to drawbar 38 of a tractor (not shown).

Collar 30 acts as a stop or limit means to confine the remaining parts of the detent means within the cylinder. Collar 30 is fixedly secured, as by spot welds 40, to the inside of cylinder 28.

First and second cam members 24, 26 cam follower segments 4 into gripping engagement with rod 14. The cam members are carried within cylinder 28. Each cam member comprises a cam section 42 and an abutment section 44. For convenience, sections 42 and 44 can be made unitary.

Cam members 24, 26 are annular to provide a passage 46 for rod 14, and are inwardly dished (FIGS. 1 and 4) so as to cam the follower segments radially inwardly. First cam member 24 is positioned adjacent collar 30 and second cam member 26 is positioned between first cam member 24 and the closed end 34 of the cylinder.

Figure 4:
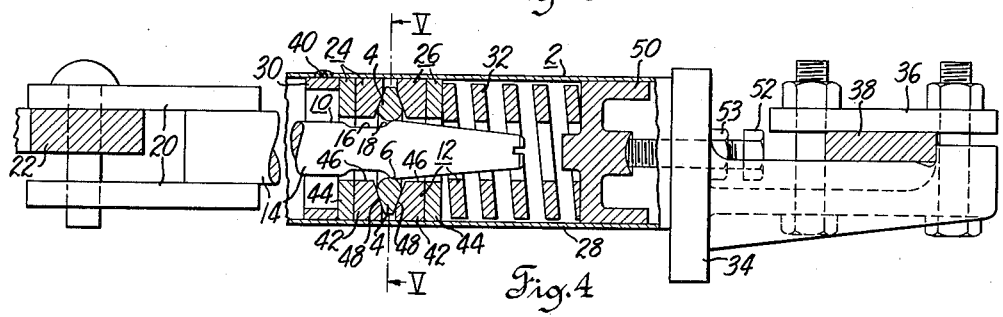
FIG. 4 is a sectional view showing the position of the various parts of the coupling when subjected to the greatest stress and in which the shouldered part of the rod has spread the follower segments their maximum distance apart.

Follower segments 4 grip rod 14. Follower segments 4 are positioned between first and second cam members 24, 26. The follower segments (FIGS. 2 and 5) are sector shaped. They have a teardrop cross section (FIGS. 1 and 4). The broad part of the tear forms gripping surface 6 and carries the load. Sides 48 (FIG. 4) of the tear are engaged by cam members 24, 26.

Spring 32 urges second cam member 26 toward first cam member 24. First cam member 24 is prevented from moving to the left (FIG. 1) by collar 30. The two cam members squeeze follower segments 4 between them so as to cam the follower segments radially inwardly. One end of spring 32 engages second cam member 26 and the other end of the spring reacts against head 34 of the cylinder.

Head 34 of said cylinder includes means for varying the force exerted by said spring on said second cam member. The means comprises a plug 50 and bolt 52. Plug 50 fits in the end of the cylinder. Bolt 52 is threaded through head 34 and abuts the plug. Rotating the bolt moves the plug axially and varies the compression of spring 32. A lock nut 53 maintains bolt 52 in position.

Figure 2:
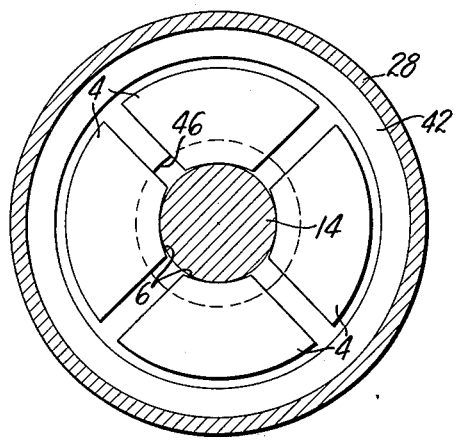
FIG. 2 is a section view of FIG. 1 taken in the direction of arrows II—II illustrating the follower segments in engagement with the rod of the coupling.
Figure 3:
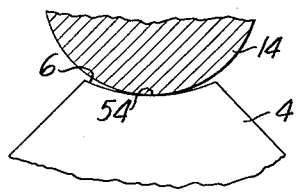
FIG. 3 is an enlarged view of a portion of FIG. 2 illustrating the contour of the segments in relationship to the rod.

FIGS. 1, 2 and 3 illustrate the engagement of follower segments 4 with rod 14 when the rod is in normal position. It can be seen (FIG. 3) that the configuration of gripping portion 6 of the follower segment is not the same as this portion of the rod. The inside curvature of follower segment 4 is greater, and only the center portion 54 of gripping surface 6 grips the rod. The load the follower segments carry in this position is not large and follower segments 4 will not be deformed by the load.

Figure 5:
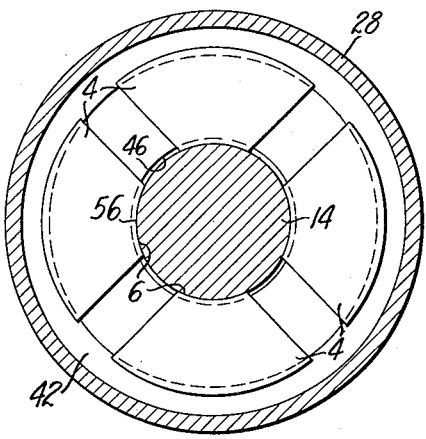
FIG. 5 is a section view of FIG. 4 taken in the direction of arrows V—V illustrating the segments in contact with the largest diameter of the shoulder of the rod.

Referring to FIGS. 4 and 5, rod 14 is shown as partially pulled out of detent means 12. Follower segments 4 have been forced radially outwardly. Cam members 24, 26 have been moved apart against spring 32. In the position illustrated in FIGS. 4 and 5, follower segments 4 have been moved their greatest distance outwardly. The spring 32 is compressed the most in this position and in turn is now exerting its greatest force on the follower segments. It is in this position that the follower segments are subjected by the contour of the rod and the spring, to the greatest stress. At this point however, the entire gripping surface 6 (FIG. 5) of each follower segment is in engagement with the rod. The gripping surface 6 is complementary to the configuration of surface 56 of the rod. The force that the gripping surface is subject to, is no longer concentrated at one or two points on the gripping surface 6 of the follower segment. The force exerted by the irregular surface of said rod on said segment, is now spread out over the entire area of contact between said gripping surface of the follower segment and said rod. As a result the stress the follower segment is subject to is much lower and the follower segment can withstand much higher forces without being deformed.

With the configuration of the follower segments complementary to surface 56, or the portion of the rod which stresses the follower segments the most, the life of the coupling has been extended. There is no tendency for the follower segment to deform. The coupling now gives uniform results with respect to releasing at the same pressure all of the time.

Operation

When a predetermined force of separation is reached between cylinder 28 and rod 14, as determined by the pressure of spring 32 and the contour of rod 14, rod 14 moves to the left (as viewed in FIG. 1). Shoulder 18 of rod 14 causes follower segments 4 to move radially outward. The follower segments spread apart annular cam members 24, 26 against the pressure of spring 32. This releases rod 14 for movement relative to cylinder 28.

Reengagement of rod 14 with detent means 12 is easily accomplished due to the gradual taper of the forward portion of the rod.

In summary my invention provides an improved releasable coupling which can withstand large loads and which lasts longer than prior art couplings.

It should be understood that it is not intended to limit the invention to the herein disclosed form, but that the invenion includes such other forms or modifications as are embraced by the scope of the appended claims.

What is claimed is:

1. In a releasable coupling for gripping a member having a recessed portion and an abutment portion, the combination comprising: a support; a first cam carried by said support; a second cam carried by said support; a plurality of follower segments positioned between and engaged by said cams, each of said follower segments having a gripping surface; each of said segments having a part of their gripping surface engaging the surface of said recessed portion prior to release of said member, and a larger part of their gripping surface engaging the surface of said abutment portion during release of said member providing a greater area of contact between said segments and said abutment portion thereby increasing the ability of said segments to carry the force that said abutment portion exerts on said segments; and, resilient means carried by said support cooperating with said cams to urge said follower segments into gripping engagement with said member.

2. In a releasable coupling for gripping a member having a recessed portion and an abutment portion, the combination comprising: a support, a first cam carried by said support; a second cam carried by said support; a plurality of sector shaped follower segments positioned between and engaged by said cams, said follower segments positioned in a plane that is perpendicular to the direction of movement of said member; each of said follower segments having a gripping surface; each of said segments having a part of their gripping surface engaging the surface of said recessed portion prior to release of said member, and a larger part of their gripping surface engaging the surface of said abutment portion during release of said member providing a greater area of contact between said segments and said abutment portion thereby increasing the ability of said segments to carry the force that said abutment portion exerts on said segments; and, resilient means carried by said support cooperating with said cams to urge said follower segments into gripping engagement with said member.

3. In a releasable coupling for gripping a rod having a first diameter and a second large diameter, the combination comprising: a support, a first cam carried by said support; a second cam carried by said support; a plurality of sector shaped follower segments positioned between and engaged by said cams; said follower segments positioned in a plane that is perpendicular to the axis of said rod; each of said follower segments having a gripping surface that is complementary to the circumferential surface of said rod at said large diameter; and resilient means carried by said support cooperating with said cams to urge said follower segments into gripping engagement with said rod.

4. A device as set forth in claim 3, wherein each of said follower segments has a teardrop cross section; said gripping surface of each of said segments being at the broad part of the tear; and said cams engage the sides of said tear.

References Cited in the file of this patent
UNITED STATES PATENTS

| | | |
|---|---|---|
| 698,127 | Mitchell | Apr. 22, 1902 |
| 2,589,599 | Bond et al. | Mar. 18, 1952 |
| 2,680,636 | Griffin | June 8, 1954 |
| 2,775,137 | Jackson Chung | Dec. 25, 1956 |

UNITED STATES PATENT OFFICE
CERTIFICATE OF CORRECTION

Patent No. 3,044,813                                          July 17, 1962

Walter A. Affeldt

It is hereby certified that error appears in the above numbered patent requiring correction and that the said Letters Patent should read as corrected below.

Column 4, line 33, for "large" read -- larger --.

Signed and sealed this 13th day of November 1962.

(SEAL)
Attest:

ERNEST W. SWIDER
Attesting Officer

DAVID L. LADD
Commissioner of Patents